June 23, 1970  W. S. TOUCHMAN  3,517,236
STEPPING MOTORS
Filed Feb. 18, 1969  6 Sheets-Sheet 1
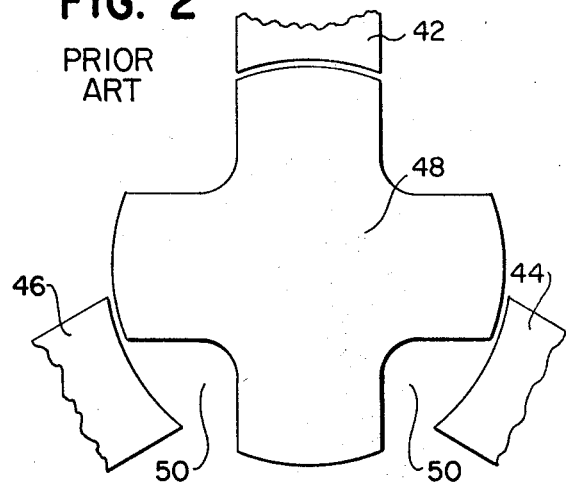
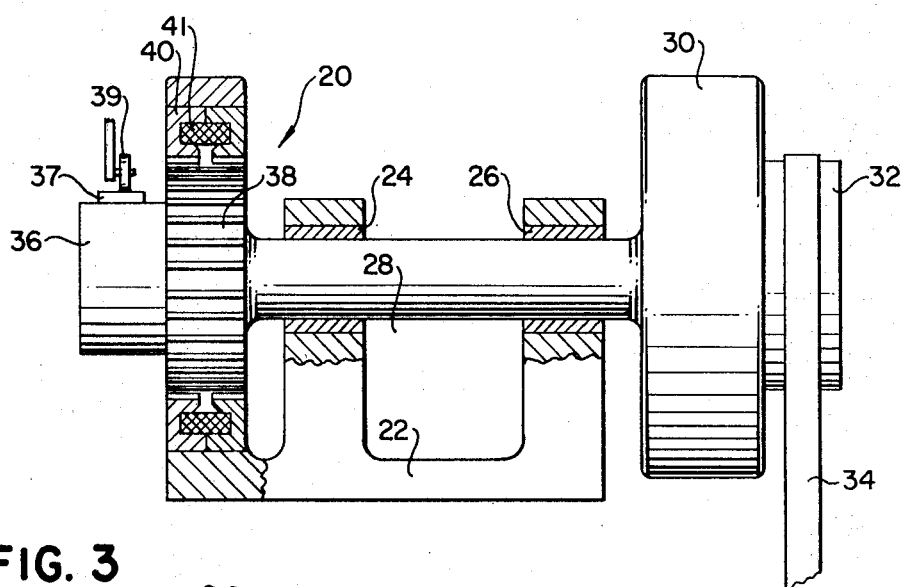
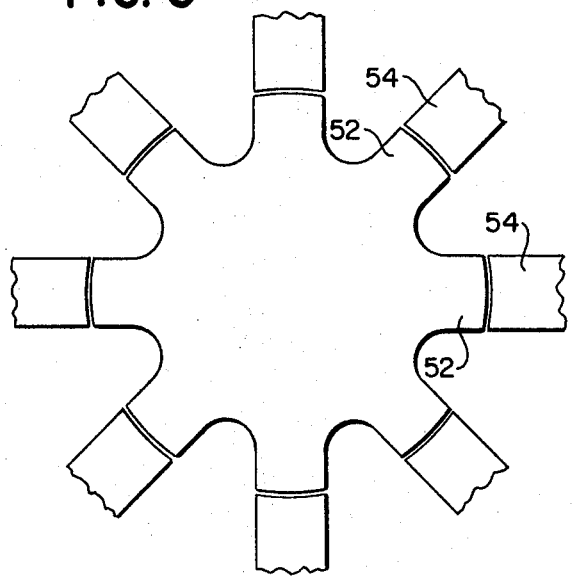
INVENTOR
WILLIAM S. TOUCHMAN
BY
HIS ATTORNEYS June 23, 1970  W. S. TOUCHMAN  3,517,236
STEPPING MOTORS
Filed Feb. 18, 1969   6 Sheets-Sheet 2

INVENTOR
WILLIAM S. TOUCHMAN

June 23, 1970 W. S. TOUCHMAN 3,517,236
STEPPING MOTORS

Filed Feb. 18, 1969 6 Sheets-Sheet 3

INVENTOR
WILLIAM S. TOUCHMAN

BY

HIS ATTORNEYS

INVENTOR
WILLIAM S. TOUCHMAN
BY
HIS ATTORNEYS

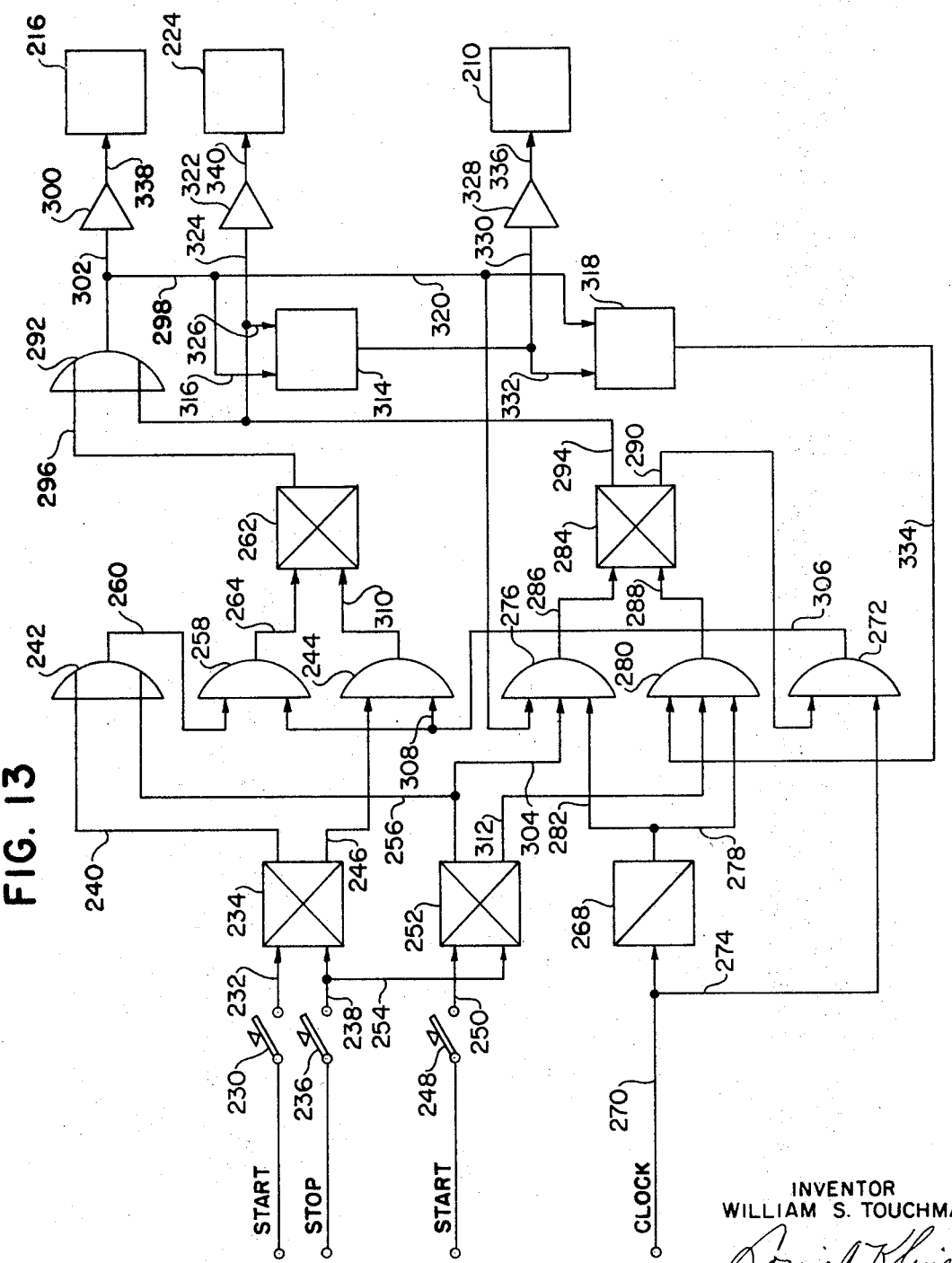

United States Patent Office

3,517,236
Patented June 23, 1970

---

3,517,236
STEPPING MOTORS
William S. Touchman, Kettering, Ohio, assignor to The National Cash Register Company, Dayton, Ohio, a corporation of Maryland
Filed Feb. 18, 1969, Ser. No. 800,184
Int. Cl. H02k 7/106
U.S. Cl. 310—96                     22 Claims

ABSTRACT OF THE DISCLOSURE

An intermittent rotary motion device for use in high-speed indexing. A resilient member, such as a shaft, is driven at the input end by a rotating flywheel and excited to torsional resonance at the other end to produce a high-frequency start-stop rotational output. The device includes magnetically-operated latch means which provide for asynchronous operation of the device in such a way that the cyclic rhythm of the intermittent motion is not detrimentally disturbed. The asynchronously-interrupted, intermittent motion produced by this device may, for example, be used in a paper tape punch, or in other applications where stepping motors may be used.

CROSS REFERENCES TO RELATED APPLICATIONS

This application is related to U.S. Pat. application Ser. No. 660,032, now Patent No. 3,460,343, and to U.S. Pat. application Ser. No. 660,031, now Patent No. 3,448,662, both said applications having been filed by applicant on the same date, Aug. 11, 1967, and both said applications being assigned to the same assignee as the instant application.

BACKGROUND OF THE INVENTION

This invention relates to an intermittent rotary motion device or stepping motor which is especially adaptable for asynchronous operation.

The basic intermittent motion device utilized in the instant invention is shown in U.S. Pat. No. 3,309,988, which issued to applicant on Mar. 21, 1967, and which is assigned to the assignee of the present invention. Various modifications of said basic intermittent motion device are shown in applicant's related said copending applications.

In an effort to expand the usefulness of applicant's prior basic intermittent motion devices, applicant has developed the embodiments of this invention, which are truly asynchronous in operation. These embodiments may be compared to the present state-of-the-art stepping motors which use magnetic poles to generate the torques required to overcome a given frictional and/or inertia load.

SUMMARY OF THE INVENTION

This invention relates to an intermittent rotary motion device which employs coupling means to provide for asynchronous operation of the device. The device includes a rotatable input means mounted in a frame means, with the input means including an input end, an output end, and resilient means interconnecting the input and output ends. Means are provided for rotating the input end at a constant angular velocity. An oscillator means acts upon the output end of the input means at substantially the resonant frequency of the device, so as to cause the output end to dwell a predetermined number of times for each revolution of the input end while the input end is rotated at a constant angular velocity. The device also includes rotatable output means which are rotatably mounted in the frame means, and coupling means selectively operable for operating in first and second modes of operation. When operating in the first mode, the coupling means is effective to couple the rotatable output means to the frame means and to uncouple the output means from the output end of the input means. When operating in the second mode of operation, the coupling means is effective to couple the output end of the input means to the output means and to uncouple the output means from the frame means. The change from first to second modes of operation and vice versa, is effected during a time when the output end is at a dwell and the input end is rotated at a constant velocity.

The invention also includes a second embodiment, similar to the first except that the second embodiment has a second constant velocity input means, which rotates at twice the angular velocity of the first input means, which rotates the input end. The second embodiment has first, second, and third modes of operation. In the first mode of operation, the coupling means is effective to couple the rotatable output means to the frame means and to uncouple the output means from the output end of the first input means and the second input means. When in the second mode of operation, the coupling means is effective to couple the rotatable output means to the output end of the first input means and to uncouple the output means from the frame means and the second input means. The change from the first to the second mode of operation is effected during a time when the output end is at a dwell and the input end is rotated at a constant velocity. When operating in the third mode, the coupling means is effective to couple the rotatable output means to the second constant angular velocity input means to thereby rotate the output means at a constant angular velocity which is twice that of the angular velocity of the input end. When in the third mode, the coupling means also uncouples the output means from the frame means and the output end of the first input means. The transition from second to third modes is made during a time when the rotatable output means is travelling at twice the angular velocity of the means which is rotating the input end of the input means. Once the transition to the third mode of operation is made, the rotatable output means is rotated at the same constant angular velocity as the second input means.

BRIEF DESCRIPTION OF THE DRAWINGS

FIG. 1 is a side view, in elevation, and partly in cross section, of the basic intermittent rotary motion device used in this invention.

FIG. 2 is a diagrammatic representation of a prior-art stepping motor, showing the relationship between the poles of its rotor and stator.

FIG. 3 is a diagrammmatic representation of the relationship between the poles of the rotor and the stator of the intermittent rotary device of this invention.

FIG. 13 is a diagrammatic view, in block form, of the control means used for operating the coupling means of the embodiment shown principally in FIG. 9.

DESCRIPTION OF THE PREFERRED EMBODIMENTS

Figure 4:
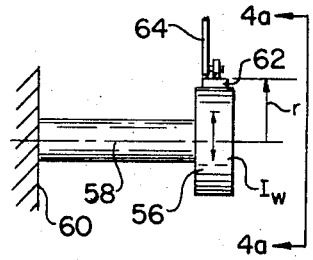
FIG. 4 is a side view, in elevation, of a stationary oscillating system used to illustrate certain principles related to this invention.

FIG. 1 is a side view of a basic intermittent rotary motion device 20 used in this invention. The basic principles of operation of the device are disclosed in said United States patent and copending United States patent applications previously mentioned; however, a brief, general description of the device will be given in order to make the instant invention more readily understood.

The general construction of the basic intermittent rotary motion device 20 shown in FIG. 1 is as follows. The device 20 includes a frame means 22 having bearings 24 and 26 located therein to rotatably support a shaft 28. The shaft 28 has an input end, to which a flywheel 30 and an input pulley 32 are secured. A belt 34, driven by another pulley (not shown), is used to rotate the input end of the shaft 28 at a constant angular velocity. The output end of the shaft 28 has an output pulley 36 and a rotor means 38 fixed thereto to rotate therewith. Enveloping the rotor means 38, in flux coupling relationship therewith, is a stator means 40, which is secured to the frame means 22. A suitable D.C. energized coil, like the coil 41, is positioned in the stator means 40. The rotor and stator means 38 and 40, respectively, together provde an oscillator means or exciter for the device.

The basic principles of operation of the intermittent motion device 20 shown in FIG. 1 are as follows. With the stator means 40 deenergized, and with the input pulley 32 rotated at constant angular velocity, the output pulley 36 also is rotated at the same angular velocity. When the device 20 is to be operated in the intermittent mode, the coil 41 of the stator means 40 is energized, causing the rotor means 38 to react therewith. When the coil 41 is energized, the output end of the shaft 28 is pulsed or excited, as disclosed in said United States patent, while its input end is rotated at a constant angular velocity. The pulsing or excitation of the output end of the shaft 28 produces an oscillatory motion which adds to and subtracts from the forward rotation of the input pulley 32. For a particular half of each cycle of oscillation of the output pulley 36, its angular rotation opposes that of the input pulley 32. The greatest angular velocity of the output pulley 36 (with respect to the input pulley 32) occurs at the instant of zero stress in the shaft 28, or when the instantaneous angle of twist of the shaft 28 is zero. This maximum velocity of the output pulley 36 occurs twice for each complete cycle: once adding to and once subtracting from the forward rotation of the input pulley 32. A dwell of the output pulley 36 occurs during a time when the oscillatory motion mentioned subtracts from the forward rotation of the input pulley 32. Although, at this time, the angular velocity of the output pulley 36 is at a maximum with respect to the input pulley 32, the output pulley 36 is substantially at a dwell with reference to a stationary point on the frame means 22. When the angular velocity of the output pulley 36 reaches its maximum in the direction of forward rotation, the maximum is substantially twice that of the input pulley 32. By a judicious selection of the geometry of the rotating parts of the device 20 according to the principles disclosed in said United States patent, the output pulley 36 undergoes intermittent rotary motion at the resonant frequency of the oscillating parts of said device. In the embodiment shown, the shaft 28 is the resilient means interconnecting the input and output means, and the shaft 28 is (alternately) stressed in torsion. With the device 20, an effective dwell of approximately one quarter-cycle is produced. The number of dwells which is obtained for each complete revolution of the input pulley 32 is related to the number of poles on the rotor means 38 and the stator means 40.

In an effort to increase the versatility of the basic intermittent motion device 20 (FIG. 1), several new mechanisms were developed which provide for truly asynchronous resonant intermittent rotary motion. These devices, shown principally in FIGS. 8, 9, and 10, may be compared with the present state-of-the-art stepping motors which use magnetic poles to generate the torques required to overcome a given frictional and/or inertial load. Before describing applicant's devices, it appears beneficial to describe the operation of a conventional stepping motor.

The principle of operation of a conventional stepping motor is easily understood by referring to FIG. 2, in which a stepping motor is shown only schematically. The motor includes a stator having three poles 42, 44, and 46. The stepping motor may be assumed to be in a detented position with the pole 42 magnetically energized. If the pole 44 is energized at or nearly at the same time that the pole 42 is deenergized, the rotor 48 (which has four poles) advances one step in a clockwise direction (as viewed in FIG. 2). If the pole 46 had been energized at the same time that the pole 42 was deenergized, the rotor 48 would have advanced one step in the opposite, or counter-clockwise, direction. Notice that, as either pole 44 or 46 is energized in the example given, a large air gap reluctance (as at 50) must be overcome.

In contrast with the prior-art stepping motor devices, applicant's devices employ coupling means which include electromagnetic latches which are turned on when the rotor and stator means of the devices are in a closed gap position, as generally illustrated in FIG. 3. The rotor poles or teeth 52 are radially aligned with the stator poles or teeth 54; consequently, very little air gap reluctance has to be overcome, and the magnetic flux in the iron poles may rise to saturation very rapidly. For best results, the stepping motor shown in FIG. 2 must have relatively wide poles or teeth which overlap, because this stepping motor is, in reality, a rotary solenoid. In applicant's devices, the rotor and stator teeth may be made much finer and more numerous than those which appear in the motor of FIG. 2 for the same holding torque and, in addition, may be maintained in more accurate alignment.

While applicant's devices disclosed herein are shown utilizing a shaft (like the shaft 28 of FIG. 1) which is placed in torsion to be used as a resilient means connecting the input and output ends of the devices, other resilient means shown in said copending United States patent applications may be used.

Figure 4A:
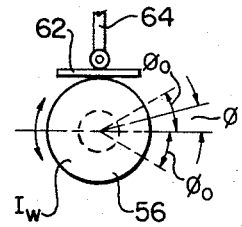
FIG. 4a is an end view, in elevation, of the system shown in FIG. 4 and is taken along the line 4a thereof.

In order to better understand the problems involved in intermittent motion devices, it is useful to begin with a discussion of a stationary oscillating system, shown in FIGS. 4 and 4a. Assume that this system is used to incrementally feed a paper tape or other medium in .100-inch steps. The system includes a wheel 56, which is fixed to one end of a shaft 58, whose remaining end is fixed to a stationary frame 60. The medium 62 is positioned on the periphery of the wheel 56, and, when it is desired to feed the medium, the following events take place. If the medium 62 is to be fed to the right (as viewed in FIG. 4a), the wheel 56 is rotated counter-clockwise for an angle $\phi_0$. When the wheel is so rotated, a capstan 64 is energized to force the medium 62 against the periphery of the wheel 56, and the wheel 56 is released to rotate clockwise through an angle of $2\phi_0$. When rotating through an angle of $2\phi_0$, the periphery of the wheel advances the medium 62 a distance of 0.100 inch, and, upon completion of the clockwise rotation, the capstan 64 moves away from the medium 62.

The wheel 56 is then rotated counter-clockwise through an angle of $2\phi_0$, and the capstan 64 again moves the medium 62 into engagement with the periphery of the wheel 56 to repeat the feeding process.

Figure 5:
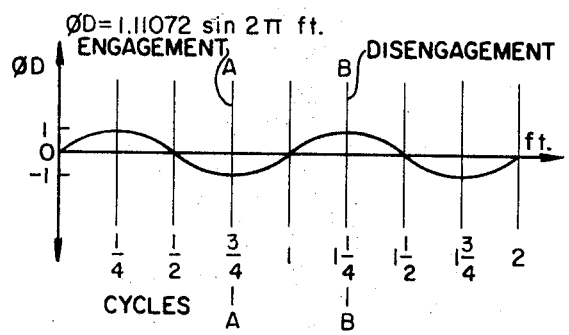
FIG. 5 is a graph used to illustrate certain related principles of this invention.

To explain some of the operating characteristics of the system shown in FIGS. 4 and 4a, the curve shown in FIG. 5 may be used. The capstan 64 urges the medium 62 against the periphery of the wheel 56 to feed it at an instant marked A—A in FIG. 5 and moves away from said periphery or releases the medium at the instant marked B—B, and, during this time, the medium has moved a theoretical distance of $2\phi_0$. For the stationary oscillating system as described in FIGS. 4 and 4a, it will be convenient to let $r$, the radius of the wheel 56, be equal to 1.0186 inches.

Therefore, $$\phi_0 = \frac{.100}{2 \times 1.0186} = 0.049087 \text{ radian}$$

Figure 7:
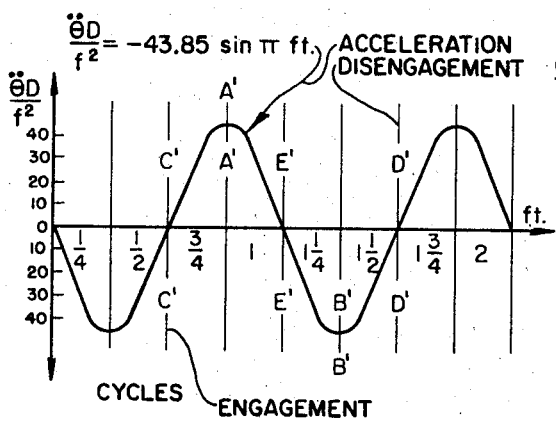
FIGS. 7 and 7a are graphs used to illustrate certain related principles of this invention.

Notice that, at the times of engagement, when the capstan urges the medium 62 against the periphery of the wheel 56 (line A—A), and disengagement (line B—B), of FIG. 5, the acceleration of the wheel 56 (line A'—A' of FIG. 7) and deceleration thereof (line B'—B' of FIG. 7) are equal and maximum. Note, too, that the accuracy of the 0.100-inch advance of the medium 62 depends upon the angle of oscillation $\phi_0$ of the wheel 56 and the reliability of engagement and disengagement of the capstan 64. It is apparent that such a system leaves much to be desired from the standpoint of accuracy and reliability.

The device 20 shown in FIG. 1, which has already been described, has advantages over the system described in FIGS. 4 and 4a, and, to point out the advantages, some mathematical relationships need to be described. The radius ($r$) of the output pulley 36 was so chosen that the number of dwells (D) per revolution of forward rotation would be an integer value. In this case, (D) is equal to 64. From said copending United States patent applications, the optimum angle of oscillation of the pulley 36 is given by the following equation:

Equation 1

$$\phi_0 = \frac{1.11072}{D} = \frac{1.11072}{64} = .017355 \text{ radian}$$

Figure 6:
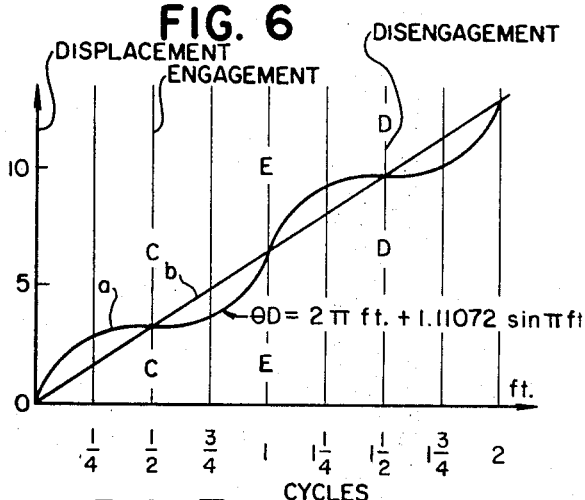
FIG. 6 is a graph used to illustrate certain related principles of this invention.

The curve shown in FIG. 6 is represented by the following equation, which was developed in said copending applications:

Equation 2

$$\theta = \frac{2\pi ft}{D} + \phi_0 \sin 2\pi ft$$

in which $\theta$ is the angular displacement.

If both sides of Equation 2 are multiplied by $r$, the true incremental advances per cycle becomes:

Equation 3

$$r\theta = \frac{2\pi ft}{D} + r\phi \sin \pi ft$$

For steady state conditions, the expression $ft$ may be made equal to 1, which, when substituted in Equation 3, becomes:

Equation 4

$$r\theta = \frac{2\pi r}{D} = \frac{2\pi \times 1.0186}{64} = .100$$

The above Equation 4 verifies the fact that the advance of the medium per cycle has no relation to the angle of oscillation of the vibrating system. Rather, the accuracy of indexing is primarily related to the angular tooth spacing of the stator means and/or the rotor means and to the inherent stability of the torsionally oscillating system.

The angle of oscillation of the stationary system (shown in FIGS. 4 and 4a) may be compared with the angle of oscillation of the rotating system (shown in FIG. 1) as follows:

$$\frac{\text{angle of oscillation of wheel 56}}{\text{angle of oscillation of pulley 36}}$$

$$= \frac{.049087 \text{ radian}}{.017355 \text{ radian}} = 2.8284$$

For the rotating system, shown in FIG. 1, the medium 37 is pressed against the pulley 36 by the capstan 39 during the quarter-cycle dwell (represented by the line C—C of FIG. 6), and the capstan is released at a time represented by the line D—D of FIG. 6. Line $b$ in FIG. 6 is the steady forward rotation of the pulley 36, and line $a$ is the oscillatory component superposed thereon. These two lines C—C and D—D (FIG. 6) correspond to the lines C'—C' and D'—D', respectively, of FIG. 7 and show that the acceleration of the pulley 36 is near zero during engagement with the capstan 39 and disengagement therefrom.

The advantage of the rotating system shown in FIG. 1 over the stationary system shown in FIGS. 4 and 4a may be summarized as follows:

(a) Engagement and disengagement of the medium take place during an effective dwell period lasting approximately for one quarter-cycle, at a time when the acceleration of the pulley 36 is at a minimum.

(b) The uniformity of the increments of linear advance of the medium is not related to the steady-state angle of torsional oscillation, but rather is related to the angular spacing of the teeth or poles of the stator means and the rotor means.

(c) The required angle of oscillation for the rotating system is only about one third of that required for the stationary system for the same linear advance of the medium, resulting in lower stresses in the resonant spring element (the shaft 28).

(d) A uniform advance of the medium is always available by simply switching off the power to the oscillator or exciter coil 41.

The use of a low-inertia capstan 39 (FIG. 1) to frictionally engage the medium 37 is a workable arrangement. However, the device 66 shown in FIG. 8 is more adaptable for asynchronous operation and for performing the functions of a high-performance unidirectional stepping motor.

Figure 8:
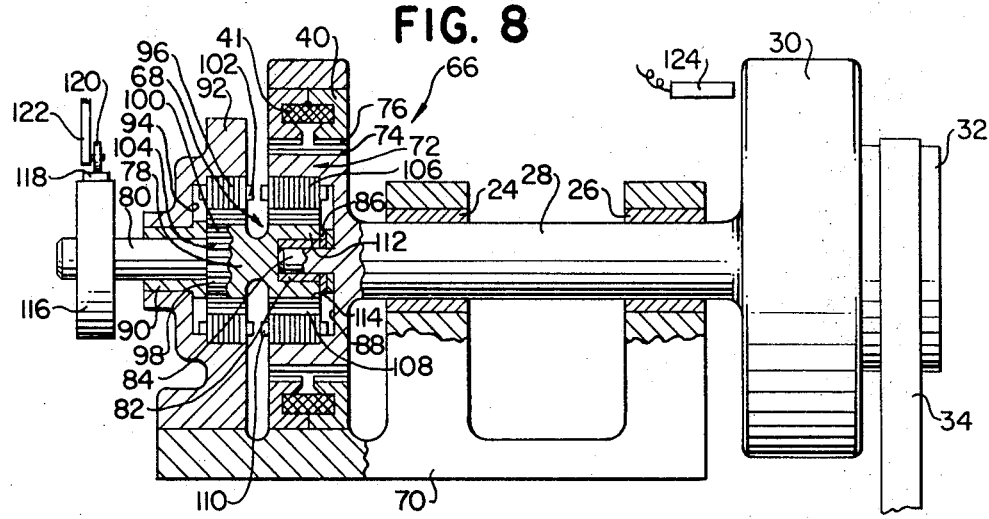
FIG. 8 is a side view, in elevation, and partly in cross section, of a first embodiment of this invention, showing the coupling means for effecting asynchronous operation of the intermittent rotary device.

The principles of operation of the instant invention are embodied in the intermittent rotary motion device 66 shown in FIG. 8, which device is more reliable and accurate than the device shown in FIGS. 4 and 4a and the prior-art device shown in FIG. 2. The device 66 shown may be used to feed a paper tape or other medium, as was illustrated with the device shown in FIGS. 4 and 4a.

The device 66 of FIG. 8 utilizes the basic intermittent device shown in FIG. 1 already described, except that a coupling means 68 is added. The device 66 has a frame means 70, having bearings 24 and 26 located therein to rotatably support a shaft 28. The shaft 28 has an input end, to which a flywheel 30 and an input pulley 32 are secured. A belt 34, driven by another pulley (not shown), is used to rotate the pulley 32 and the input end of the shaft 28 at a constant angular velocity. The output end of the shaft 28 has a rotor means 72 fixed thereto to rotate therewith. The rotor means 72 has, on its periphery, external poles or teeth 74, which react with the poles or teeth 76 on the stator means 40, which envelops the rotor means 72 in flux coupling relationship therewith. The stator means 40 and the rotor means 72 are similar to their counterparts already described in relation to the device 20 shown in FIG. 1, and the stator means 40 includes a suitable coil, like the coil 41. The rotor and stator means 72 and 40 cooperate to provide an oscillator means or exciter for the device 66. As previously stated, the oscillator means acts upon the output end of the shaft 28 at substantially the resonant frequency of the rotating input means of the device 66 so as to cause the output end of the shaft 28 to dwell a predetermined number of times for each revolution of its input end while the input end is rotated at a constant angular velocity.

The coupling means 68 (FIG. 8), alluded to earlier, is selectively operable for operating in first and second modes of operation. When operating in the first mode, the coupling means 68 is effective to couple a rotatable output means to the frame means and to uncouple said output means from the output end of the shaft 28. The rotatable output means includes a coupling member 78 having an output shaft 80 extending from one end thereof. The opposite end of the member 78 has therein a recess into which a bearing 82 is fitted. The bearing 82 rotatably supports the coupling member 78 on a reduced-diameter portion 84, which extends from the output end of the shaft 28. A suitable thrust bearing 86 is positioned between the coupling member 78 and the output end of the shaft 28, which has a recess 88 therein. The recess 88 has a longitudinal axis which is coincident with the longitudinal axis of the shaft 28. The shaft 80, which extends from the coupling member 78, is rotatably supported in a bearing 90, which is supported in a frame member 92, which in turn is secured to the frame means 70. The frame member 92 has therein an annular recess 94, which receives a first stator means 96, which cooperates with a first rotor means 98 located on the periphery of one end of the coupling member 78. The stator means 96 and the rotor means 98 cooperate to form a latch means for coupling the coupling member 78 to the frame member 92 when the latch means is energized. The stator means 96 includes poles or teeth 100 and coils 102. The rotor means 98 has teeth or poles 104 located on the periphery of the coupling member 78. When the coils 102 are energized, the teeth 100 magnetically react with the teeth 104 on the coupling member 78 to hold the member 78 stationary relative to the frame member 92.

When the coupling means 68 is operated in the second mode of operation, the coupling member 78 is coupled to the output end of the shaft 28 by the construction shown in FIG. 8. The coupling means 68 includes a second stator means 106, which is located in the recess 88, and the stator means 106 includes poles or teeth 108 and coils 110, which are similar and equal in number to the poles 100 and coils 102 at the opposite end of the coupling member 78. The coupling means 68 also includes a second rotor means 112, which has teeth 114 on the periphery of the coupling member 78. The second stator means 106 and rotor means 112 cooperate to form a latch means for coupling the coupling member 78 to the output end of the shaft 28. The output shaft 80 has a drive drum 116 secured thereto to rotate therewith, and a medium 118, like paper tape, is kept in engagement with the periphery of the drive drum 116 by the roller 120 of a conventional capstan 122.

The general operation of the device 66 shown in FIG. 8 is as follows. With the coupling means 68 in the first mode, the coupling member 78 is fixed relative to the frame member 92 due to the energization of the coils 102, and, with the coil 41 deenergized, the shaft 28 may be rotated at a constant angular velocity by the drive pulley 32. When it is desired to operate the device 66 in the intermittent mode, the coil 41 of the magnetic oscillator is energized, and the stator teeth 76 magnetically react with the teeth 74 on the rotor 72 to cause the output end of the shaft 28 to dwell a predetermined number of times for each revolution of the drive pulley 32, as previously explained. When the device 66 is to be operated in the second mode, the coils 102 are deenergized while simultaneously energizing the coils 110 by the circuit shown in FIG. 12, which will be described later. A clocking pulse for effecting the transfer from first to second modes of operation is obtained from a conventional magnetic pick-up means 124 placed near the periphery of the flywheel 30, on which a total number of D magnetic marks appear (not shown). These marks D are spaced at equal angular intervals around the flywheel 30, one mark being provided for each dwell. The transfer from first to second modes is made at a time when the output end of the shaft 28 is at a dwell. When operated in the second mode, the intermittent rotary motion of the output end of the shaft 28 is transferred by the coupling means 68 to the output shaft 80 to incrementally feed the medium 118. When the device 66 is to be switched back to and operated in the first mode, the coils 110 are deenergized, and the coils 102 are simultaneously energized by the control means of FIG. 12.

It should be pointed out that, when the output end of the shaft 28 (FIG. 8) is undergoing intermittent rotary motion, and the coupling means 68 is in the first mode, switching the coupling means to the second mode immediately transfers the intermittent rotary motion to the output shaft 80. The first cycle of intermittent rotary motion so transferred to the output shaft 80 has the same cycle time as subsequent cycles, which are performed with the coupling means 68 remaining in the second mode of operation to provide for truly asynchronous operation of the device. This feature is in contrast to prior-art stepping motors, which generally require a somewhat longer cycle time for the first cycle of operation of intermittent rotary motion when compared to subsequent cycles.

The combined inertia of the work load connected to the output shaft 80 (FIG. 8) and the coupling member 78 must be appreciably less than that of the rotor means 72 if the device 66 is to work properly. The reason for this is that adding inertia to an oscillating mass (like the rotor means 72) of a resonant system at the instant of zero velocity does not add energy to or subtract energy from the total stored energy in the system. Therefore, the amplitude of oscillation of the rotor means 72 remains the same, but the added inertia lowers the resonant frequency of the system, which automatically adjusts the speed of forward rotation downwardly according to the principles explained in the previously-cited U.S. Pat. No. 3,309,988. If the sum of the inertias of the work load and the coupling member 78 becomes too large in relation to that of the rotor means 72, the speed adjustment downward cannot respond fast enough, resulting in an unfavorable transient oscillation.

Because the magnetic shear torques of the second latch means are much smaller than the shear torques allowable in the shaft 28, there is no practical advantage in attempting to latch on a work load inertia approaching the inertia of the rotor means 72. Since there appears to be no upper limit to the magnitude of the inertia of the rotor means 72, the range of inertias which can be stepped or indexed by the present invention appears limitless.

Figure 12:
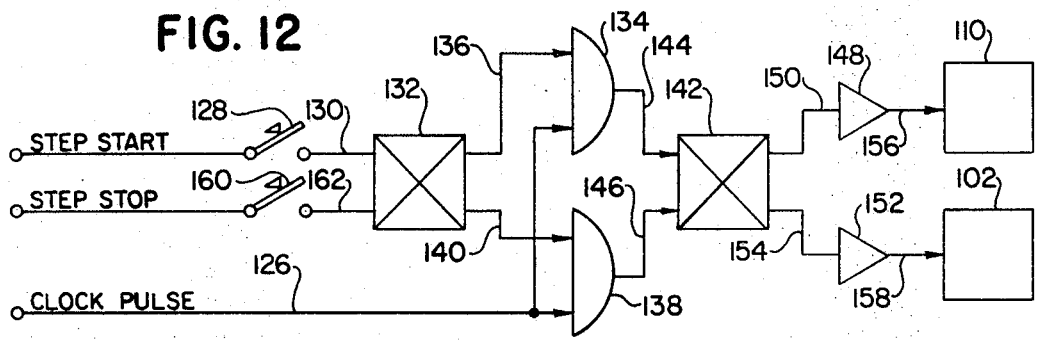
FIG. 12 is a diagrammatic view, in block form, of the control means used for operating the coupling means of the embodiment shown principlally in FIG. 8.

The control means for operating the coupling means 68 (FIG. 8) in the first and second modes of operation is shown in FIG. 12. The clocking pulse passing over a conductor 126 is derived conventionally from the pick-up 124 (FIG. 8), and a switch 128 is closed when it is desired to transfer the coupling means from the first mode to the second mode of operation. The switch 128, having one end connected to a source of potential, has its other end connected to a conductor 130, which is also connected to one input of a conventional flip-flop 132. One output of the flip-flop 132 is connected to one input of an AND gate 134 by a conductor 136. The remaining output of the flip-flop 132 is connected to one input of an AND gate 138 by a conductor 140. The remaining inputs to the AND gates 134 and 138 are connected to the conductor line 126 to receive the clocking pulse from the pick-up 124. The output from the AND gate 134 is connected to one input of a flip-flop 142 by a conductor 144, and the output from the AND gate 138 is connected to the remaining input to the flip-flop 142 by a conductor 146. One output from the flip-flop 142 is connected to the input of a conventional amplifier 148 by a conductor 150, and the remaining output from the flip-flop 142 is connected to a second conventional amplifier 152 by a conductor 154. The output from the amplifier 148 is connected to the coils 110 (also shown in FIG. 8) by a conductor 156, and the output from the second amplifier 152 is connected to the coils 102 (also shown in FIG. 8) by a conductor 158.

The operation of the control means shown in FIG. 12 is as follows. Assume that the device 66 of FIG. 8 is operating intermittently and that the coupling means 68 is in the first mode of operation, with the coils 102 energized, and it is desired to change it into the second mode. To change to the second mode, the switch 128 is closed. The closing of the switch 128 conventionally places a signal having a "one" level over the conductor 130 to the flip-flop 132, which causes a signal having a "one" level to appear on the conductor 136. When the clocking pulse signal, also having a "one" level, arrives over the conductor 126 to the AND gate 134, it combines with the signal from the conductor 136 to produce an output signal at a "one" level, which is routed to the flip-flop 142 over the conductor 144, which in turn causes a signal at a "one" level to be fed to the amplifier 148 over the conductor 150. With the amplifier 148 so energized, the coils 110 become energized. When the conductor 150 has a "one" level thereon, the conductor 154, coming from the other output of the flip-flop 142, has a signal of "zero" level thereon; and, consequently, the amplifier 152 is deenergized to deenergize the coils 102. It is apparent that the coils 102 are deenergized simultaneously with the energization of the coils 110. The coupling means 68 will remain in this second mode of operation until a switch 160 is closed.

The closing of the switch 160 (FIG. 12) is effective to change the coupling means 68 (FIG. 8) to the first mode of operation, in which the output shaft 80 is held stationary relative to the frame means 70. When the switch 160 is closed, a signal having a "one" level (from a conventional source of potential) passes over a conductor 162 to the flip-flop 132 to reset it. Resetting the flip-flop 132 causes the output on the conductor 140 to go to a "one" level, while, simultaneously, the output on the conductor 136 goes to a "zero" level. When the next clock pulse occurs, a signal having a "one" level passes over the conductor 126 to the AND gate 138. With two signals having a "one" level appearing at both inputs to the AND gate 138, an output signal having a "one" level passes over the conductor 146 to the flip-flop 142 to reset it. Resetting the flip-flop 142 produces a signal having a "one" level at the conductor 154 to energize the amplifier 152, which energizes the coils 102. It is apparent that, as the coils 102 are energized, the coils 110 are simultaneously deenergized to place the coupling means 68 in the first mode of operation.

Figure 9:
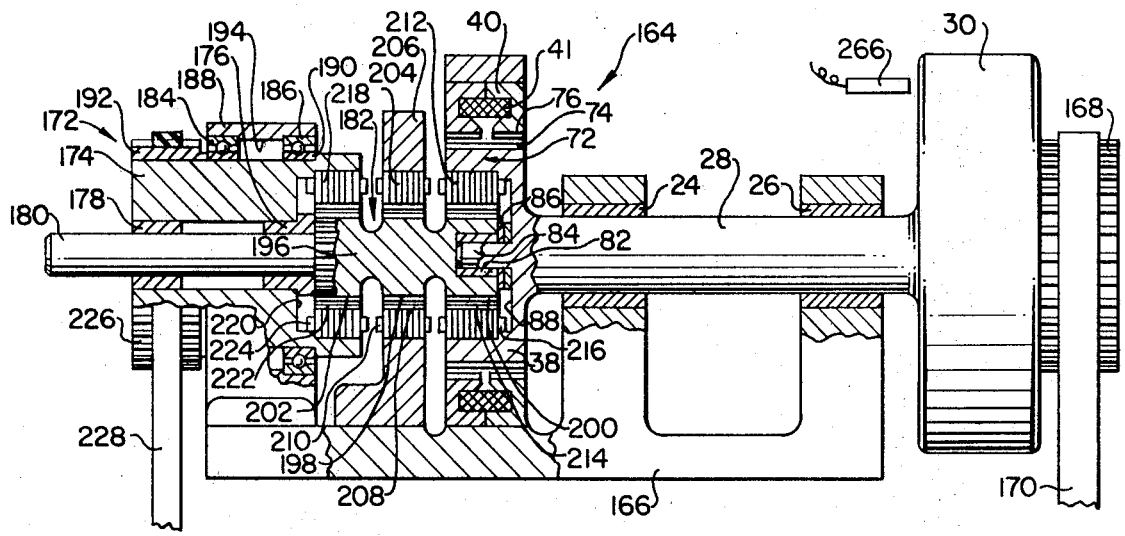
FIG. 9 is a side view, in elevation, and partly in cross section, of a second embodiment of this invention, showing the coupling means for effecting asynchronous operation of the invention, and also showing a second input to the device over that shown in the first embodiment of FIG. 8.

FIG. 9 is a view similar to FIG. 8 but shows a second embodiment of the intermittent rotary motion device of this invention, which is designated generally as 164. Those elements of the device 164 which are similar to elements of the device 66 of FIG. 8 are given the same numerical designations. The device 164 includes a frame means 166 having bearings 24 and 26 located therein to rotatably support a shaft 28. The shaft 28 has an input end, to which a flywheel 30 and an input pulley 168 are secured. A timing belt 170, driven by another pulley (not shown), is used to rotate the pulley 168 and the input end of the shaft 28 at a constant angular velocity. The output end of the shaft 28 has a rotor means 72 fixed thereto to rotate therewith. The rotor means 72 has external poles or teeth 74 on its periphery, which poles react with the poles or teeth 76 on the stator means 40, which envelops the rotor means 72 in flux coupling relationship therewith. The stator means 40 and the rotor means 72 are similar to their counterparts already described in relation to the devices 20 and 66, shown in FIGS. 1 and 8, respectively. A suitable coil, like the coil 41, is positioned in the stator means 40. The rotor and stator means 38 and 40, respectively, provide an oscillator means or exciter for the device 164. As previously explained, the oscillator means acts upon the output end of the shaft 28 at substantially the resonant frequency of the device 164, so as to cause the output end of the shaft 28 to dwell a predetermined number of times for each revolution of its input end, while the input end is rotated at a constant angular velocity.

As previously stated, in the Summary, the device 164 has a second input means, which is designated generally as 172 and which is shown in FIG. 9. The second input means 172 includes a cylindrical, tubular member 174, which is rotatably supported on bearings 176 and 178. These bearings 176 and 178 are tubular and are rotatably mounted on a shaft 180, which is part of a coupling means designated generally as 182 and which will be described later. The outer wall of the tubular member 174 is rotatably supported in bearings 184 and 186, which in turn are secured in a circular enveloping frame member 188, which is secured to the frame means 166. The tubular member 174 has an annular shoulder 190, which abuts against the bearing 186 to restrain the member from movement in one axial direction. The tubular member 174 is restrained from axial movement in the opposite direction by a drive pulley 192, which is fixed to the tubular member 174 to rotate it, and which drive pulley 192 abuts against the inner race of the bearing 184. The frame member 188 is appropriately recessed on its inner wall 194 to receive the outer races of the bearings 184 and 186 and thereby restrain any axial movement of the bearings toward each other.

The coupling means 182 shown in FIG. 9 is selectively operable for operating in first, second, and third modes of operation. When operating in the first mode, the coupling means 182 is effective to couple a rotatable output means to the frame means and to uncouple the rotatable output means from the output end of the first input means, and to uncouple it from the second input means 172. The rotatable output means includes a coupling member 196 having the output shaft 180 extending from one end thereof. The opposite end of the coupling member 196 has therein a recess into which a bearing 82 is fitted. The bearing 82 rotatably supports the coupling member 196 on a reduced-diameter portion 84, which extends from the output end of the shaft 28. A suitable thrust bearing 86 is positioned between the coupling member 196 and the output end of the shaft 28, which has a circular recess 88 therein. The recess 88 has a longitudinal axis which is coincident with the longitudinal axis of the shaft 28. The shaft 180 is rotatably supported in the bearings 176 and 178.

The coupling member 196 (FIG. 9) has, on its periphery, first, second, and third rotor means, which include poles or teeth 198, 200, and 202, respectively, which are part of first, second, and third latch means, in that order. The first said latch means includes the poles or teeth 198 of the first rotor means, and a first stator means 204. The stator means 204 is located in a ring-shaped frame member 206, which is secured to the frame means 166, and includes stator poles or teeth 208 and coils 210, which are in flux coupling relationship with the poles 198 of the first rotor means.

The second latch means (FIG. 9) includes the poles or teeth 200 of the second rotor means, and a second stator means 212, which is located in the annular recess 88 of the output end of the shaft 28 and is fixed thereto to rotate therewith. The stator means 212 includes stator poles 214 and coils 216 in flux coupling relationship with the poles 200 of the second rotor means.

The third latch means (FIG. 9) includes the poles or teeth 202 of the third rotor means, and a third stator means 218, which is located in an annular recess 220 of the tubular member 174 and is fixed thereto to rotate therewith. The third stator means 218 includes poles or teeth 222 and coils 224 in flux coupling relationship with the poles 202 of the third stator means. The number of poles 202 of the third rotor means is equal to the number of poles 200 and 198 of the second and first rotor means, respectively. The number of poles 222 of the third stator means is equal to the number of poles 214 and 208 of the second and first stator means, respectively. The poles of the first, second, and third stator means are equally spaced along radial lines, so as to be aligned with the associated poles of the first, second, and third rotor means on the coupling member 196.

The operation of the coupling means 182 shown in FIG. 9 is as follows. When the coupling means 182 is operated in the first mode, the first latch means, including the first rotor and stator means, is effective (via the circuit means shown in FIG. 13) to couple the coupling member 196 to the frame means 166. At the same time, the second and third latch means are deenergized by said circuit means to uncouple the coupling member 196 from the output end of the shaft 28 and from the tubular member 174 of the second input means 172, respectively. With the coupling means 182 in the first mode, the shaft 28 may be rotated at a constant velocity $V_1$ by the belt 170 and the pulley 168, and the exciter coil 41 may be energized, enabling the rotor means 72 to experience intermittent rotary motion, as previously explained. At this time, no intermittent rotary motion is transferred to the output shaft 180, because the coupling means is operated in the first mode.

When it is desired to transfer the intermittent rotary motion of the rotor means 72 (FIG. 9) to the output shaft 180, the coupling means 182 is operated in the second mode. When operating in the second mode, the first latch means is deenergized and the second latch means is energized by the circuit means shown in FIG. 13, and the third latch means remains deenergized. Deenergization of the first latch means frees the coupling member 196 from the frame member 206, and simultaneous energization of the second latch means couples the coupling member 196 to the rotor means 72 to transfer the intermittent rotary motion of the rotor means 72 thereto, and to the output shaft 180. The transfer from first mode to second mode is made during a time when the rotor means 72 is at a momentary dwell. At the time of transferring from first mode to second mode, the third latch means (including the coils 224) is deenergized, so that the second input means 172 freely rotates on the output shaft 180 at twice the angular velocity of the first input means, represented by the input pulley 168.

When it is desired to operate the coupling means 182 of the second embodiment 164 (FIG. 9) in the third mode, the transfer thereto is made from the second mode. To effect the transfer, the second latch means is deenergized to uncouple the coupling member 196 from the rotor means 72, and the third latch means is simultaneously energized to couple the poles 202 of the third rotor means with the poles 222 of the third stator means at a time when the coupling member 196 is traveling at twice the angular velocity $V_1$ of the drive pulley 168. At this time, the coupling member 196 is traveling at the same angular velocity as the second input means 172, so the coupling between the poles 202 of the third rotor means and the poles 222 of the third stator means can be made at a time when the relative velocity between them approaches zero. During the transfer from the second mode to the third mode of operation, the first latch means remains deenergized to permit the coupling member 196 to be rotated. The output shaft 180 then rotates at the same constant angular velocity as the tubular member 174 of the second input means 172, which member 174 is rotated by a drive pulley 226, secured thereto. The drive pulley 226 is driven by a belt 228 at twice the angular velocity of the pulley 168.

Figure 7A:
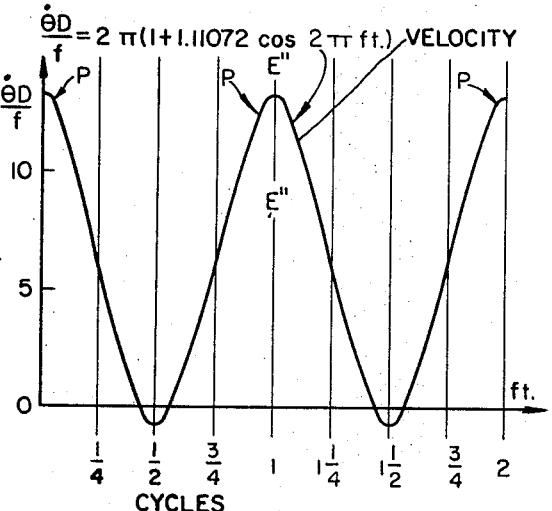

The first and second latch means of the device 164 (FIG. 9) operate in the same manner as the first and second latch means of the device 66, shown in FIG. 8. As previously stated, when the device 164 is transferred from the second mode to the third mode of operation, the output shaft 180 travels at twice the angular velocity of the input pulley 168. This is represented by the line E—E in FIG. 6, the acceleration (near zero) corresponding to the vertical line E'—E' in FIG. 7, and the velocity (slightly over twice the velocity of the flywheel 30) corresponding to the vertical line E''—E'' on the velocity curve P in FIG. 7a. The poles or teeth on the rotor means and stator means of the first and second latch means (FIG. 9) are radially aligned and are related to the number of dwells (D) per revolution of the forward rotation or even multiples thereof. The third latch means, however, requires only $D/2$ number of poles or teeth. The phase relationship between the tubular member 174 and the poles of the second latch means (FIG. 9) must be such that the poles of the third latch means and the second latch means line up tooth to tooth when there is no stress in the shaft 28.

The circuit means for controlling the operation of the coupling means 182 shown in FIG. 9 is shown in block form in FIG. 13. The elements shown in FIG. 13 are standard logical components and therefore need not be described in detail. The circuit includes a start switch 230 (for stepping motion) having one terminal connected to a conductor 232, which is connected to one input of a flip-flop 234. A stop switch 236, having one terminal connected to a conductor 238, is connected to the remaining input (reset) of the flip-flop 234. The remaining terminals of the switches 230 and 236 are connected to a source of potential (not shown). A conductor 240 connects one output of the flip-flop 234 to one input of an OR gate 242. The remaining output of the flip-flop 234 is connected to one input of an AND gate 244 by a conductor 246.

A start switch 248 (FIG. 13) (for constant velocity rotation in the third mode of operation) has one terminal connected in series with a conductor 250, which is connected to one input of a flip-flop 252. The other terminal of the switch 248 is connected to a source of potential (not shown). The other input (reset) of the flip-flop 252 is connected to the similar input of the flip-flop 234 by a conductor 254. One output of the flip-flop 252 is connected to the OR gate 242 by a conductor 256. The output of the OR gate 242 is connected to one input of an AND gate 258 by a conductor 260. The output of the AND gate 258 is connected to one input of a flip-flop 262 by a conductor 264.

A first clocking pulse, conventionally derived from a pick-up 266 (shown in FIG. 9 and similar to the pick-up 124 of FIG. 8), is connected to the input of a variable one-shot 268 by a conductor 270. This same first clocking pulse is also fed into the input of an AND gate 272 by a conductor 274. The output of the one-shot 268 is actually a second clocking pulse, which is 180 degrees out of phase with the first clocking pulse and is connected to an input of an AND gate 276 by a conductor 282. The second clocking pulse is also fed into the input of an AND gate 280 by a conductor 278. The output of the AND gate 276 is fed to one input of a flip-flop 284 over a conductor 286, and the output of the AND gate 280 is fed to the remaining input (reset) of the flip-flop 284 by a conductor 288. One output of the flip-flop 284 is connected to the input of the AND gate 272 by a conductor 290, while its other output is connected to one input of an exclusive OR gate 292 by a conductor 294. The remaining input to the exclusive OR gate 292 is connected to one output of the flip-flop 262 by a conductor 296. The output of the exclusive OR gate 292 is connected to a second input of the AND gate 276 by a conductor 298, and said output is also connected to the input of an amplifier 300 by a conductor 302. The third input to the AND gate 276 is connected to one output of the flip-flop 252 by a conductor 304. The output of the AND gate 272 is connected to an input of the AND gate 258 by a conductor 306, and this same output is connected to the AND gate 244 by a conductor 308. The output of the AND gate 244 is connected to an input (reset) of the flip-flop 262 by a conductor 310. The second output from the flip-flop 252 is connected to a third input to the AND gate 280 by a conductor 312. The output of the exclusive OR gate 292 is connected to one input of a NOR gate 314 by a conductor 316, and this same output is also connected to a NOR gate 318 by a conductor 320. The output of the flip-flop 284 coming from the conductor 294 is connected to the input to an amplifier 322 by a conductor 324, and this same output is also connected to an input to the NOR gate 314 by a conductor 326. The output from the NOR gate 314 is connected to an amplifier 328 by a conductor 330, and this same output is also connected to an input to the NOR gate 318 by a conductor 332. The output from the NOR gate 318 is, in turn, connected to an input to the AND gate 280 by a conductor 334.

The amplifiers shown in FIG. 13 are conventional and are used to operate the coils of the first, second, and third latch means as follows. The output of the amplifier 328 is connected to the coils 210 of the first latch means by a conductor 336. The output of the amplifier 300 is connected to the coils 216 of the second latch means by a conductor 338, and, similarly, the output of the amplifier 322 is connected to the coils 224 of the third latch means by a conductor 340. The outputs of these amplifiers are used to energize their associated coils.

Because the logical components shown in FIG. 13 are conventional and operate conventionally, only a general explanation of the functioning of the circuit will be given.

The pattern of functioning of the circuit shown in FIG. 13 is similar to the circuit shown in FIG. 12, which was explained in detail. Assume that the rotor means 72 (FIG. 9) is already operating in the intermittent mode, and that the coupling means 182 is in the first mode, with the coupling member 196 fixed relative to the frame means 166. At this time, the coils 210 (FIGS. 9 and 13) are energized, and the coils 216 and 224 are deenergized.

When it is desired to operate the coupling means 182 (FIG. 9) in the second mode, the following events occur. Assume that a pulse from clock 1 arrives over the conductor 270 from the pick-up 266, shown in FIG. 9, and that the pulse, for example, is at a "one" level. Assume also that the flip-flop 234 is in the reset condition, with a signal of a "one" level appearing on the conductor 246. When the switch 230 is closed, a signal having a "one" level is routed to the flip-flop 234 to set it, thereby producing a signal having a "one" level on the conductor 240 leading to the OR gate 242. At that time, the flip-flops 252 and 284 remain in the reset condition, with signals having a "one" level appearing on the conductors 312 and 290, respectively. While the flip-flop 262 is also in the reset condition at this time, its "one" level signal is not used. When a signal having a "one" level arrives from clock 2 (which is 180 degrees out of phase with clock 1), no change results in the setting of the named flip-flops. When the next signal from clock 1 arrives, the flip-flop 262 is set (via the AND gates 272 and 258), placing a signal having a "one" level on the conductor 296, leading to the exclusive OR gate 292, which energizes the amplifier 300 and the coils 216. Simultaneously with the energization of the coils 216, the coils 210 of the first latch means are deenergized, and the coils 224 of the third latch means remain deenergized. The coupling means 182 will continue to be operated in the second mode of operation (intermittent rotary motion of the shaft 180, FIG. 9) until the switch 236 (FIG. 13) is closed.

Upon the closing of the switch 236 (FIG. 13), the coupling means 182 reverts to the first mode of operation. The closing of the switch 236 resets the flip-flop 234 to place a signal having a "one" level on the conductor 246, leading to the AND gate 244. When the next signal from clock 1 arrives (via the AND gate 272), the AND gate 244 is effective to reset the flip-flop 262, causing the output on the conductor 296 to go to a "zero" level; the output of the exclusive OR gate 292 then goes to a "zero" level to deenergize the amplifier 300 and the coils 216 of the second latch means. The flip-flops 252 and 284 remain in the reset condition, with a signal having a "one" level appearing on the conductors 312 and 290, respectively. Simultaneously with deenergization of the coils 216, the coils 210 of the first latch means are energized by the output of the NOR gate 314 going to a "one" level. The coils 224 of the third latch means remain deenergized, due to the flip-flop 284 being in the reset condition, with a signal having a "zero" level appearing on the conductor 294. With the coils 210 energized, the output shaft 180 remains stationary while the rotor means 72 is intermittently rotated.

Assuming that the coupling means 182 FIG. 9) is operated in the first mode, and it is desired to operate it in the third mode (in which the coupling member 196 rotates at the same angular velocity as the second input means 172), the following events occur upon the closing of the switch 248 (FIG. 13). The closing of the switch 248 sets the flip-flop 252, causing the output on the conductor 256 to go a "one" level; the remaining flip-flops 234, 262, and 248 remain unchanged. When clock 2 goes to a "one" level, no change results in any of the flip-flops; however, when clock 1 goes to a "one" level, the flip-flop 262 is set, placing a "one" level signal on the conductor 296, leading to the exclusive OR gate 292, whose output on the conductor 302 goes to "one" level. With a signal having a "one" level on the conductor 302, the amplifier 300 is energized to thereby energize the coils 216. The coils 210 and 224 of the first and third latch means, respectively, remain deenergized at this instant. When the next pulse from clock 2 goes to a "one" level, the flip-flop 284 is set by a signal arriving over the conductor 286 from the AND gate 276, and consequently a signal having a "one" level appears on the conductor 294. The conductor 324 is also connected to the conductor 294, so the amplifier 322 is energized to thereby energize the coils 224 of the third latch means. Because clock 2 is 180 degrees out of phase with clock 1 (which occurs when the coupling member 196 is at a dwell during intermittent rotary motion), the energization of the coils 224 occurs at an instant when the coupling member 196 (FIG. 9) is traveling at substantially twice the angular velocity of the pulley 168, so that the angular velocity of the coupling member 196 approximates that of the tubular member 174 of the second input means 172, and the coupling member 196 is latched to the tubular member 174 when there is little (if any) relative motion between them. After the latching, the coupling member 196 is rotated at the constant angular velocity of the second input means 172; that is, the angular velocity of the pulley 226.

The coupling member 196 and the output shaft 180 (FIG. 9) continue to rotate at the constant angular velocity of the pulley 226 of the second input means 172 until the stop switch 236 (FIG. 13) is closed. Upon closing of the switch 236, the flip-flop 252 is reset to cause an output signal having a "one" level to appear on the conductor 312. The remaining flip-flops remain unchanged at this instant. When the next pulse from clock 1 arrives on the conductor 274, no change in the flip-flops occurs; however, when the next clock 2 signal goes to a "one"

level, the flip-flop 284 is reset by a signal having a "one" level arriving via the conductor 288 from the AND gate 280. When the flip-flop 284 is reset, resulting in a signal having a "zero" level appearing on the conductor 294, the amplifier 322 and the coils 224 are deenergized and the coils 216 of the second latch means are simultaneously energized to latch the coupling member 196 to the rotor means 72 at a time when it is traveling at an angular velocity which is twice that of the input pulley 168. When the next clock 1 signal goes to a "one" level, the flip-flop 262 is reset by a signal having a "one" level coming from the AND gate 244 via the conductor 310, so as to place a signal having a "zero" level on the conductor 296, leading to the exclusive OR gate 292, which deenergizes the amplifier 300 and the coils 216 to uncouple the coupling member 196 from the coils 216. This latter clock 1 signal is also effective through the exclusive OR gate 292 to cause a signal having a "one" level to appear on the conductor 330, which energizes the amplifier 328 and the coils 210 of the first latch means. Because the coils 210 are energized at a time when the clock 1 goes to a "one" level, the coupling of the member 196 to the frame means 166 occurs at a time when the rotor means 72 is at a dwell.

Figure 10:
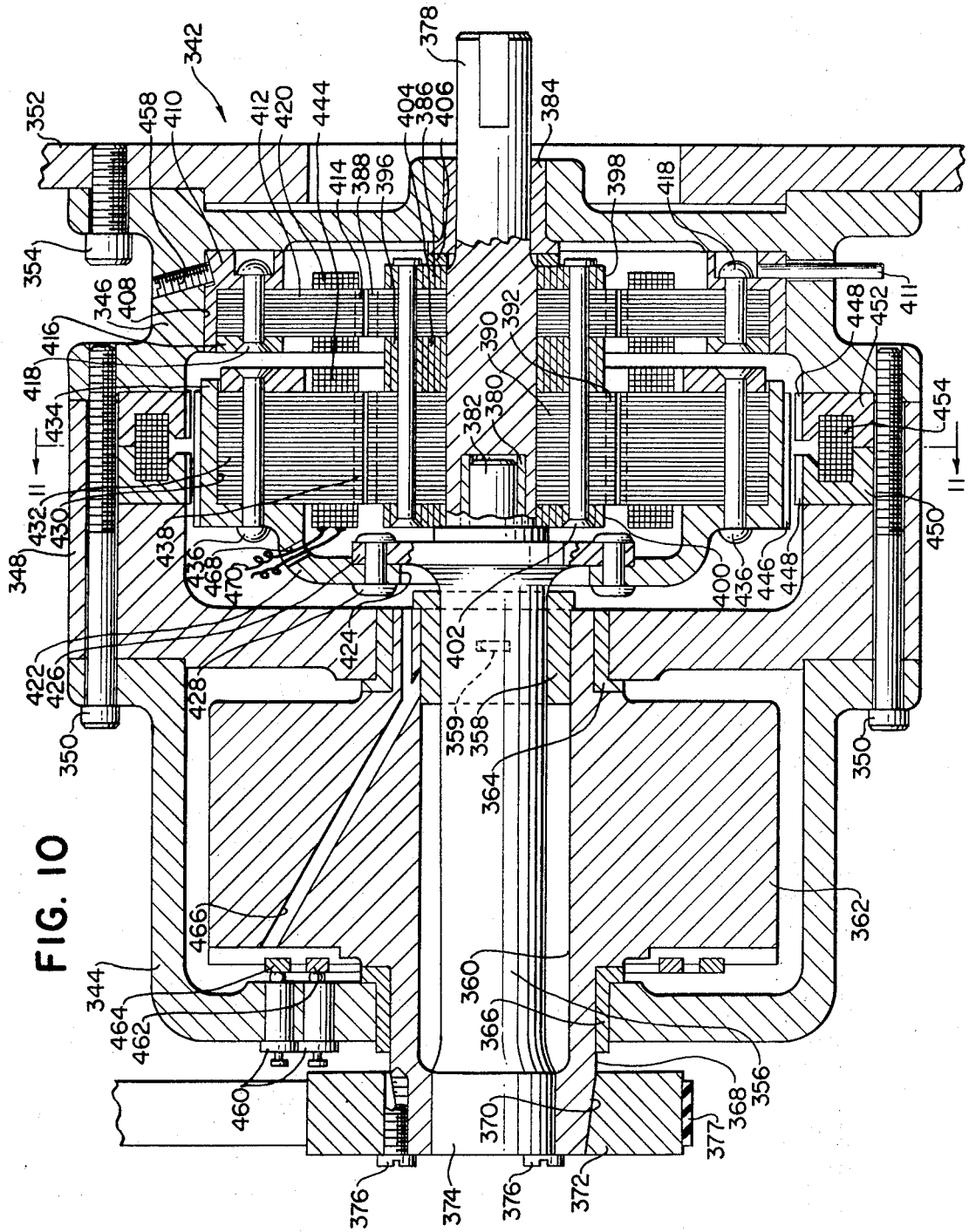
FIG. 10 is a side view, in elevation, and partly in cross section, of a stepping motor employing the principles of the first embodiment of this invention.
Figure 11:
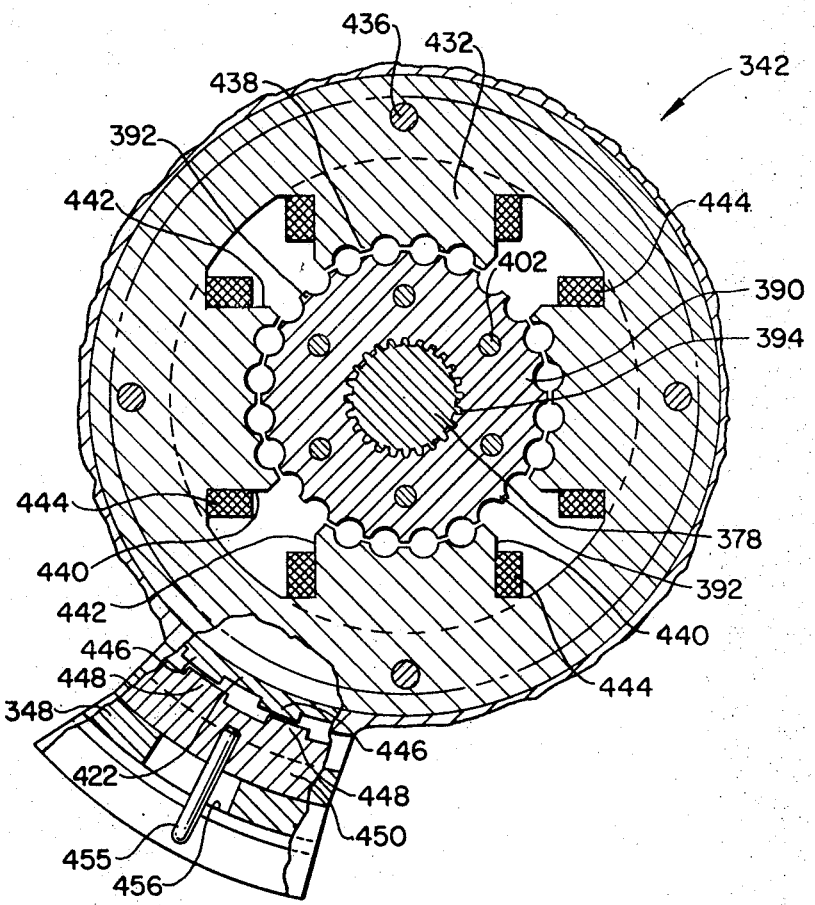
FIG. 11 is a cross sectional view of the stepping motor shown in FIG. 10, and is taken along the line 11—11 thereof to show more details of the motor.

The stepping motor device designated generally as 342 and shown in FIGS. 10 and 11 operates on the same principles as the mechanism 66 shown in FIG. 8. The device 342 shown in FIG. 10 is made up of end housing members 344 and 346 and a central housing member 348, which are bolted together by fasteners 350, as shown. The end housing member 346 is shown bolted to an apertured mounting plate 352 by fasteners 354. The plate 352 may be part of a mechanism (not shown) which the stepping mechanism 342 drives. The input shaft 356 to the device 342 is rotatably mounted at one end in a conventional split bushing 358, which is inserted in a circular bore 360 having a longitudinal axis which is coincident with the longitudinal axis of the shaft 356, and which bore 360 is located in a flywheel 362. The halves of the split bushing 358 are secured together by fasteners 359. The flywheel member 362 is rotatably supported at one end by a bushing 364, which is located in an aperture in the central housing 348, and is similarly supported at the other end by a bushing 366, which is located in an aperture in the end housing member 344. The flywheel member 362 is constrained against movement in an axial direction between the housing members 344 and 348 by the bushings 364 and 366. The flywheel member 362 has a reduced-diameter portion 368 extending out of the end housing member 344, and this portion is split along one side thereof and is conically tapered on the exterior, as at 370, to receive a conventional wedge-type driving pulley 372. The portion 368 has an internal square opening to receive a mating square end 374 of the input shaft 356. When fasteners 376 are tightened, the pulley 372 is drawn towards the end housing member 344 and onto the split end portion 368 via the taper 370, so as to clamp this portion to the square end 374 of the shaft 356 and thereby form a driving connection between the pulley 372, the input shaft 356, and the flywheel member 362. The pulley 372 is rotated at a constant angular velocity by a belt 377, which is connected to a driving pulley (not shown).

The output shaft 378 is mounted in the device 342 (FIG. 10) by a construction similar to that shown in FIG. 8. The left-hand end of the shaft 378 has therein a bore in which a bushing 380 is mounted. The input shaft 356 has a reduced-diameter portion 382 extending from its inner end, which portion is rotatably mounted in the bushing 380. The shaft 378 is also rotatably mounted in a bushing 384, which is mounted in an aperture in the end housing member 346.

The first and second rotor means of the device 342 are mounted on the output shaft 378 (FIGS. 10 and 11) as follows. The first rotor means includes a plurality of laminations 386 with poles or teeth 388 formed on the outer periphery thereof. The second rotor means includes a plurality of laminations 390 with poles or teeth 392 formed on the periphery thereof, as shown in FIG. 11. The laminations 386 and 390 are identical in size and shape and are secured to the shaft 378 by a conventional coupling which includes teeth 394 on the shaft 378 and matching recesses on the individual laminations 386 and 390. Conventional insulating-type spacers 396 (FIG. 10) are positioned between the laminations 386 and 390; conventional spacers 398 and 400 are positioned on the outer extremities of the laminations 386 and 390; and the whole assembly is secured together by fasteners 402 to form the coupling member designated generally as 404. A suitable ring-type bearing 406 is positioned between the coupling member 404 and the bushing 384 to accommodate any axial thrust of the member 404 in the direction of the end housing member 346.

The first rotor means has a first stator means associated therewith to form a first latch means, and the first stator means, shown in FIG. 10, is constructed in the following manner. The end housing member 346 has therein a bore 408, in which a ring member 410 is located. The ring member 410 has a pin 411 secured thereto to provide for angular adjustment thereof relative to the housing 346. The ring member 410 also has therein a bore in which a plurality of stator laminations 412, having poles or teeth 414, are positioned. A flat ring 416 is also positioned in the ring member 410 after the laminations 412 are inserted therein, and fasteners 418 are used to secure the laminations flat therein, as shown in FIG. 10. Coils 420 for the stator means are also shown. When the coils 420 are energized, the coupling member 404 becomes fixed to the frame means which includes the housing member 346.

The second rotor means has a second stator means associated therewith to form a second latch means, and the second stator means includes a generally cup-shaped member 422, having the cross-sectional shape shown in FIG. 10. The member 422 has an opening 424, through which the shaft 356 passes, and the shaft 356 has a flanged portion 426, which is secured to the member 422 by fasteners 428. The cup-shaped member 422 also has therein a bore 430, into which a plurality of laminations 432 are positioned, which laminations have the shape shown in FIG. 11. A ring plate 434, which also fits into the bore 430, and fasteners 436 are used to secure the laminations 432 to the cup-shaped member 422. The laminations 432 have a plurality of poles or teeth 438 and opposing pairs of parallel sides 440 and 442 (FIG. 11), around which coils 444 are formed. The poles 438 on the stator means are radially aligned with the poles 392 on the second rotor means and are spaced apart, as shown in FIG. 11, to form a flux coupling relationship therebetween when the coils 444 are energized and thereby couple the second stator means to the second rotor means, as previously explained with the embodiment 66 shown in FIG. 8.

The oscillator or exciter for the device 342 shown in FIGS. 10 and 11 is constructed in the following manner. The rotor teeth or poles 446 of the oscillator are equally spaced on the periphery of the cup-shaped member 422. The stator poles 448 are formed on two ring members, 450 and 452, which are mounted in recesses in the housing members 348 and 346, respectively. The members 450 and 452, when assembled as shown in FIG. 10, contain the exciter coil 454. Each ring member 450 and 452 can be rotated in its associated recess by an associated pin 455. For example, the pin 455 for the ring member 450 is shown in FIG. 11, and it is secured to the ring member 450. A recess 456 is provided in the housing member 348, so as to enable the member 450 to be rotated by the pin 455 so as to provide a phase adjustment of the teeth 448 thereon with the teeth 446 of the ring member 452 according to the principles disclosed in the previously-cited United States patent. When the ring members 450, 452, and 410 are adjusted, they are fixed relative to their respective housing members by fasteners, like the fastener 458, shown only for the ring member 410.

The energizing current for the coils 444 of the second stator means (FIG. 10) is derived via conventional brushes 460, secured to the housing member 344, and slip rings 462 and 464, which are fixed to the flywheel member 362 to rotate therewith. A suitable passageway 466 is present in the flywheel member 362, and a hole is drilled in the cup-shaped member 422 to provide a path for the conductors 470, leading from the coils 444 to the brushes 460.

The device 342 shown in FIGS. 10 and 11 is operated in first and second modes of operation in exactly the same manner as the device 66 shown in FIG. 8. The circuit means for controlling the operation of the device 342 is exactly the same as that shown in FIG. 12; therefore, it is not duplicated herein.

What is claimed is:

1. An intermittent rotary motion device comprising:
    frame means;
    rotatable means mounted in said frame means and including an input end, an output end, resilient means interconnecting said input and output ends, and rotatable output means;
    means for rotating said input end at a constant velocity;
    oscillator means acting upon said output end at substantially the resonant frequency of said rotatable means so as to cause said output end to dwell a predetermined number of times for each revolution of said input end while said input end is rotated at a constant velocity;
    and coupling means being selectively operable for operating in a first mode of operation which couples said rotatable output means to said frame means and uncouples said output means from said output end, and for operating in a second mode of operation which couples said rotatable output means to said output end for rotation therewith and uncouples said output means from said frame means.

2. The device as claimed in claim 1 in which said coupling means effects a change from said first to second mode of operation and vice versa during a time when said output end is at a dwell and said input end is rotated at a constant velocity.

3. The device as claimed in claim 2 in which said rotatable output means is axially aligned with said rotatable input means.

4. The device as claimed in claim 2 in which said coupling means include latch means for effecting said first and second modes of operation.

5. The device as claimed in claim 4 in which said rotatable output means includes a rotatable member, said latch means comprising:
    first latch means adapted to operatively couple said rotatable member with said frame means when said coupling means is in said first mode; and
    second latch means adapted to operatively couple said output end with said rotatable member when said coupling means is in said second mode.

6. The device as claimed in claim 5 in which said first and second latch means are magnetically operated.

7. The device as claimed in claim 6 in which said first latch means comprises:
    a first rotor means mounted on said rotatable member;
    and a first stator means fixed to said frame means;
    said first rotor and stator means cooperating to couple said rotatable member to said frame means when said first latch means is energized upon operating said coupling means in said first mode;
    said second latch means comprising:
    a second rotor means mounted on said rotatable member for rotation therewith and being axially spaced from said first rotor means;
    and a second stator means mounted on said output end for rotation therewith;
    said second rotor and stator means cooperating to couple said rotatable member with said output end for rotation therewith when said second latch means is energized upon operating said coupling means in said second mode.

8. The device as claimed in claim 7 in which said coupling means include control means for simultaneously energizing said first latch means and deenergizing said second latch means, and vice versa.

9. The device as claimed in claim 7 in which said oscillator means is magnetically operated.

10. The device as claimed in claim 8 in which said first and second rotor means each has an equal number of poles thereon; said first and second stator means each having poles thereon which are radially aligned with the poles of their respective first and second rotor means.

11. The device as claimed in claim 7 further including means for angularly adjusting said exciter means and said first stator means within said frame means.

12. An intermittent rotary motion device comprising:
    frame means;
    rotatable means mounted in said frame means and including an input end, an output end, resilient means interconnecting said input and output ends, and rotatable output means;
    first input means for rotating said input end at a constant velocity;
    oscillator means acting upon said output end at substantially the resonant frequency of said rotatable means so as to cause said output end to dwell a predetermined number of times for each revolution of said input end while said input end is rotated at a constant velocity;
    second input means for rotating said rotatable output means at twice the angular velocity of said first input means when coupled thereto;
    said coupling means being selectively operable for operating in first, second, and third modes of operating;
    said coupling means, when in said first mode, being effective to couple said rotatable output means to said frame means and to uncouple said rotatable output means from said output end and from said second input means;
    said coupling means, when in said second mode, being effective to couple said rotatable output means to said output end and to uncouple said rotatable output means from said frame means and from said second input means;
    said coupling means when in said third mode being effective to couple said rotatable ouput means to second input means and to uncouple said rotatable output means from said frame means and from said output end.

13. The device as claimed in claim 12 in which said coupling means effects a change from said first mode to said second mode of operation and vice versa during a time when said output end is at a dwell and said input end is rotated at a constant velocity.

14. The device as claimed in claim 13 in which said coupling means include latch means for effecting said first, second, and third modes of operation.

15. The device as claimed in claim 14 in which said rotatable output means includes a rotatable member, said latch means comprising:
    first latch means adapted, when energized, to operatively couple said rotatable member with said frame means when said coupling means is in said first mode;
    second latch means adapted, when energized, to operatively couple said output end with said rotatable member when said coupling means is in said second mode;
    and third latch means adapted, when energized, to operatively couple said rotatable member with said second input means when said coupling means is in said third mode.

16. The device as claimed in claim 15 in which said first, second, and third latch means are magnetically operated.

17. The device as claimed in claim 16 in which said first latch means comprises:
   a first rotor means mounted on said rotatable member, and a first stator means fixed to said frame means;
   said first rotor and stator means cooperating to couple said rotatable member to said frame means when said first latch means is energized upon operating said coupling means in said first mode;
   said second latch means comprising:
   a second rotor means mounted on said rotatable member for rotation therewith and being axially spaced from said first rotor means, and a second stator means mounted on said output end for rotation therewith;
   said second rotor and stator means cooperating to couple said rotatable member with said output end for rotation therewith when said second latch means is energized upon operating said coupling means in said second mode;
   said third latch means comprising:
   a third rotor means mounted on said rotatable member for rotation therewith and being axially spaced from said first and second rotor means, and a third stator means mounted on said second input means for rotation therewith;
   said third rotor and stator means cooperating to couple said rotatable member with said second input means when said third latch means is energized upon operating said coupling means in said third mode.

18. The device as claimed in claim 17 in which said coupling means include selectively operable control means for simultaneously energizing said first latch means while deenergizing said second and third latch means when said coupling means is operated in said first mode, for simultaneously energizing said second latch means while deenergizing said first and third latch means when said coupling means is operated in said second mode, and for deenergizing said first latch while simultaneously energizing said second latch means and thereafter deenergizing said second latch means and simultaneously energizing said third latch means when said coupling means is operated in said third mode.

19. The device as claimed in claim 18 in which said oscillator means is magnetically operated.

20. The device as claimed in claim 19 in which said first, second, and third stator means each has a plurality of poles and in which said first, second, and third rotor means have a plurality of poles which are equal in number and which are radially aligned with the poles on said first, second, and third stator means respectively.

21. The device as claimed in claim 18 in which said coupling means effects a change from said first mode to said second mode of operation during a time when said output end is at a dwell and said input end is rotated at a constant velocity.

22. The device as claimed in claim 18 in which said coupling means effects a change from said second mode to said third mode of operation during a time when said output end is rotating at an angular velocity which is faster than an even multiple of the angular velocity of said input end.

References Cited

UNITED STATES PATENTS

| | | | |
|---|---|---|---|
| 3,309,988 | 3/1967 | Touchman | 101—93 |
| 3,448,622 | 6/1969 | Touchman | 74—1.5 |
| 3,075,137 | 1/1963 | Bessiere | 322—40 |
| 2,931,928 | 4/1960 | Fehn | 310—96 XR |
| 3,344,378 | 9/1967 | Wilhelmson | 310—49 XR |

MILTON O. HIRSHFIELD, Primary Examiner

B. A. REYNOLDS, Assistant Examiner

U.S. Cl. X.R.

74—1.5; 101—93; 310—49, 93